S. S. STAHL.
AUTOMOBILE LOCKING DEVICE.
APPLICATION FILED JUNE 16, 1917.
1,262,127.
Patented Apr. 9, 1918.
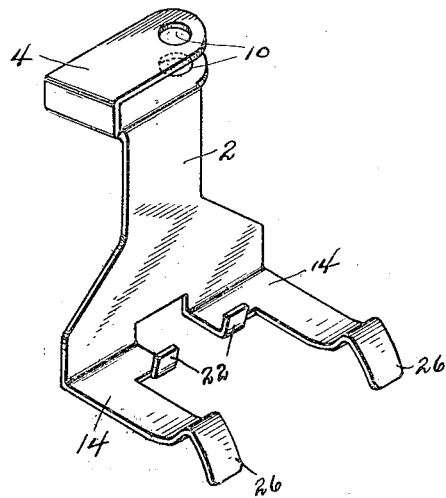
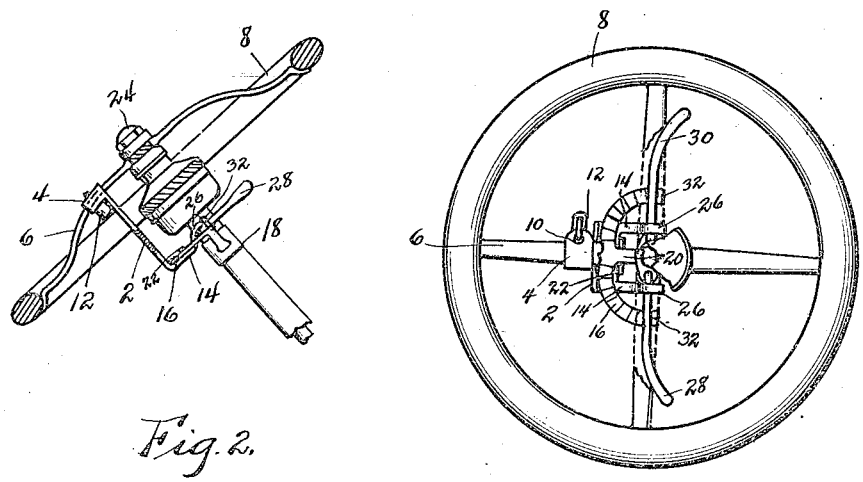

UNITED STATES PATENT OFFICE.

SAMUEL S. STAHL, OF KANSAS CITY, KANSAS.

AUTOMOBILE-LOCKING DEVICE.

1,262,127.            Specification of Letters Patent.        Patented Apr. 9, 1918.

Application filed June 16, 1917. Serial No. 175,052.

*To all whom it may concern:*

Be it known that I, SAMUEL S. STAHL, a citizen of the United States, residing at Kansas City, in the county of Wyandotte, State of Kansas, have invented certain new and useful Improvements in Automobile-Locking Devices, of which the following is a full and exact specification.

The present invention relates to devices for locking and maintaining inoperative the steering gear and throttle and spark control levers of automobiles and thereby preventing the use of the same by unauthorized persons. Accordingly, one of the objects in view is to provide an extremely simple and inexpensive device which may be readily and quickly applied in position for securely locking the steering wheel against either rotation or removal from the steering column and at the same time retaining the control levers in their inoperative positions and preventing any movement thereof so long as said device is in locking position.

It is also an object to devise a locking means of this character which, on being unlocked, will readily become disengaged from its locking position by a simple movement of the steering wheel, thereby causing the device to at once drop out of engagement with the parts to which it is applied.

More specifically, the invention comprises a plate bracket member having means for detachably locking it with the steering wheel, and extending on past and into non-rotatable engagement with the quadrant bracket on the steering column, and having fingers projecting from the quadrant-engaging portion of the device for holding the spark and throttle control levers in inoperative relation.

It is also sought to devise a simple one-piece construction which will be easy to handle, strong and durable, and have nothing to get out of order, and also be economical to manufacture.

With these general objects in view, the invention will now be described with reference to the accompanying drawing illustrating one form of embodiment of the improved device, after which those features deemed to be novel will be set forth and defined in the appended claims.

In the drawing—

Figure 1 is a perspective view of a locking device constructed in accordance with the present invention;

Fig. 2 is a side elevation, on a smaller scale, showing a steering wheel and column with the locking device applied in operative or locking position, the steering wheel being represented partly in section; and Fig. 3 is a plan view of the same, partly broken away.

Referring to the drawing in detail, this illustrates the locking device as comprising a plate bracket member adapted to be constructed out of suitable metal, such as sheet steel, being cut out in one piece from such sheet metal and shaped so as to form a body portion 2 having at its upper end a yoke or keeper 4 adapted to embrace one of the spokes 6 of the steering wheel 8. This yoke or keeper 4 is provided with openings 10 for receiving the shackle of a suitable padlock 12 when the device is to be locked to the steering wheel.

At its opposite or lower end portion the locking device is forked to provide arms 14 extending forward and adapted, when applied in locking position as shown in Figs. 2 and 3, to extend underneath the quadrant bracket 16 which is carried by the steering column 18. At the opposite sides of one of the fixed radial arms 20 of the bracket 16, the said arms 14 are formed with the lugs 22 adapted to snugly embrace the sides of said arm 20 and thereby hold the locking device against any rotative movement with reference to the axis of the steering column. The steering wheel having one of its spokes 6 secured within the yoke 4, it is likewise held from turning; and as the arms 14 engage underneath the quadrant bracket 16, the wheel is also locked against removal in case one should endeavor to take off the wheel by removing the nut 24.

The arms 14 terminate in the hooked fingers 26 adapted to be extended over the two control levers 28 and 30 which regulate the throttle and spark, respectively, when the latter are thrown to inoperative position against their limiting stops 32 on the quadrant bracket 16. The arrangement is such that when the locking device is applied in the relation shown, said fingers 26 hold said control levers securely against the stops 32 and prevent any operation of the levers so long as the locking device is in this position.

To apply the locking device so as to occupy the position illustrated in Figs. 2 and 3, it is inserted so as to bring the arms 14 up underneath the quadrant bracket and engage the fingers 26 over the control levers 28 and 30; the device is then lifted or turned so as to cause the lugs 22 to embrace the opposite sides of the radial arm 20 of said bracket, and bring the yoke or keeper 4 into position to receive one of the spokes 6 of the steering wheel. The wheel is then turned in a direction to bring the nearest spoke 6 into the yoke 4, whereupon the padlock 12 is applied to the openings 10. In this manner the control levers are securely locked in inoperative or fully retarded position and can not be operated while thus engaged by the retaining fingers 26; and it is impossible to disengage the locking device or to turn the steering wheel without breaking either the locking device or the quadrant bracket. Nor can the steering wheel be removed by taking off the nut 24, since the locking device is so engaged with the quadrant bracket as to prevent any movement of the steering wheel in an axial direction with reference to the steering column. Thus, not only are the control levers held inoperative but also the steering wheel, and hence an unauthorized person can not operate the control mechanism nor change the position of the steering mechanism from that in which it has been locked. No special form of padlock is required for use with the device, as any ordinary type that is reliable will answer the purpose; and in unlocking the parts it is only necessary to remove the padlock and then turn the steering wheel slightly, whereupon the device simply falls out of engagement with the quadrant bracket. With this locking means the wheels of the car may be set and locked either straight, that is, so the car may be moved forward when necessary, as in case of a fire in business districts; or the wheels may be turned and locked up to the side of the curb if desired. It is obvious that the device, being of a simple one-piece construction, may be cheaply manufactured, and when not in use it requires no special place for storing it but may be simply carried on the seat beside the driver.

While the foregoing represents what is now deemed to constitute the preferred form of construction, the right is reserved to such formal changes as may fall within the scope of the appended claims. For example, if the quadrant bracket is located above the steering wheel, as is the case with some cars, it is only necessary that the form of the device be altered by reversing the direction in which the body portion 2 extends to accommodate this altered position of the quadrant bracket and control levers.

What I claim is:

1. The combination with the steering wheel, steering wheel column, quadrant bracket and control levers on said column, of a locking device comprising a one-piece member having means for detachably locking with said wheel, said member being detachably engaged with said bracket and formed with a pair of lugs for embracing opposite sides of one of the radial arms of said bracket, the bracket-engaging portion of said member terminating in fingers extending over said control levers and locking the latter in inoperative position.

2. The combination with a steering wheel, steering wheel column, and quadrant bracket and control levers on said column, of a locking device comprising a one-piece member having means for detachably locking with said wheel, said member being formed with arms extending beneath and up through said bracket upon opposite sides of one of the radial arms of the bracket and provided with lugs projecting upward in position to engage said opposite sides of said radial arm for preventing rotative movement of the device, the arms of said member also terminating in fingers extending over said control levers and locking the latter in inoperative position.

In witness whereof I hereto affix my signature.

SAMUEL S. STAHL.

Copies of this patent may be obtained for five cents each, by addressing the "Commissioner of Patents, Washington, D. C."